United States Patent [19]
Legler et al.

[11] Patent Number: 6,155,524
[45] Date of Patent: Dec. 5, 2000

[54] QUICK RELEASE LOCKING SYSTEM

[75] Inventors: William P. Legler; Kenneth E. Logan, both of Erie, Pa.

[73] Assignee: Legler Plating Works, Inc., Erie, Pa.

[21] Appl. No.: 09/234,541

[22] Filed: Jan. 21, 1999

Related U.S. Application Data

[60] Provisional application No. 60/072,220, Jan. 22, 1998.

[51] Int. Cl.$^7$ .............................. A47B 96/00; A47K 1/00; E04G 5/06; B25G 3/00; F16D 1/00
[52] U.S. Cl. ..................... 248/221.11; 403/319; 403/381; 248/225.11
[58] Field of Search .......................... 248/225.11, 223.21, 248/220.21, 220.22, 221.11, 221.12, 222.41, 551, 553, 552; 403/381, 331, 319, 315; 70/58

[56] References Cited

U.S. PATENT DOCUMENTS

| | | | |
|---|---|---|---|
| 1,432,349 | 10/1922 | McFarland | 403/381 |
| 1,835,042 | 12/1931 | Hammer | 248/225.11 |
| 2,127,285 | 8/1938 | Brecht | 403/319 |
| 2,540,784 | 2/1951 | Hocher | 248/225.11 |
| 3,392,848 | 7/1968 | McConnell et al. | 248/221.12 |
| 3,455,528 | 7/1969 | Meyer | 248/221.12 |
| 3,731,956 | 5/1973 | Hanley | 248/221.12 |
| 4,687,425 | 8/1987 | Takano et al. | 403/381 |
| 4,893,777 | 1/1990 | Gassaway | 248/223.21 |
| 5,024,409 | 6/1991 | Bohnen | 248/223.21 |
| 5,273,246 | 12/1993 | Stahara et al. | 248/225.11 |
| 5,277,512 | 1/1994 | Dwilles | 403/381 |
| 5,931,529 | 8/1999 | LaPointe et al. | 403/319 |

*Primary Examiner*—Ramon O. Ramirez
*Assistant Examiner*—Jon Szumny
*Attorney, Agent, or Firm*—Wayne L. Lovercheck

[57] ABSTRACT

A lock is provided to releasably secure a first member to a second member. The lock has two brackets, one attached to the first member and the other attached to the second member. The first is a locking slotted bracket and the second is a locking pin bracket. The locking pin bracket has pins with heads that extend outwardly from the locking pin bracket. The locking slotted bracket has a T-shape to receive the pins, and a lock lever that snaps into a locking position between the pin heads in the slot to hold the pins in the slot. The heads can be removed by deflecting the lock lever and sliding the heads of the pins out of the T-shaped slot. The lock lever is biased and flexible so that it rests in a locked condition. For longer or heavier structures or where position is important, a slotted bracket with a keyhole-shaped slot may be provided. The keyhole-shaped slot receives a head of a pin which will slide into a wider slot and into an undercut where it is retained.

30 Claims, 10 Drawing Sheets

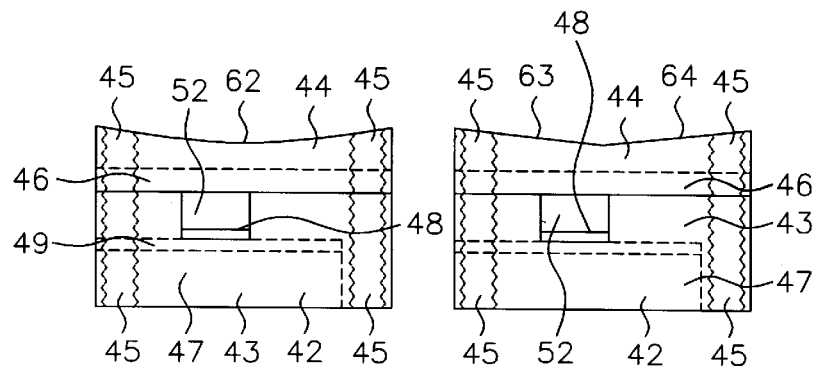
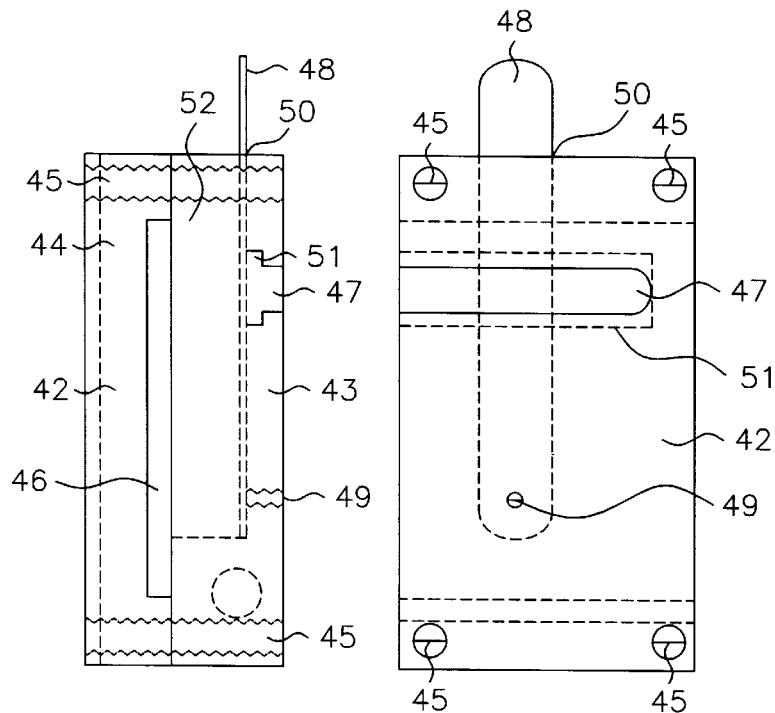
FIG. 15   FIG. 16
FIG. 14   FIG. 13

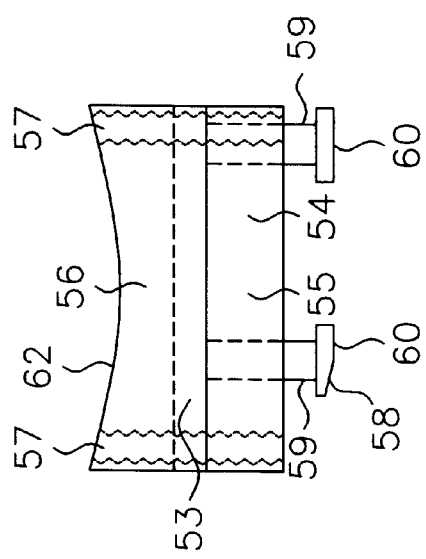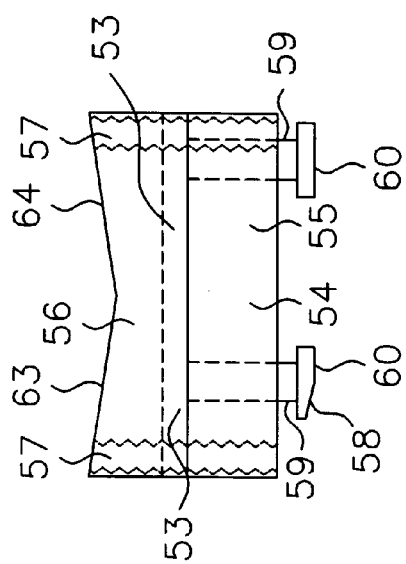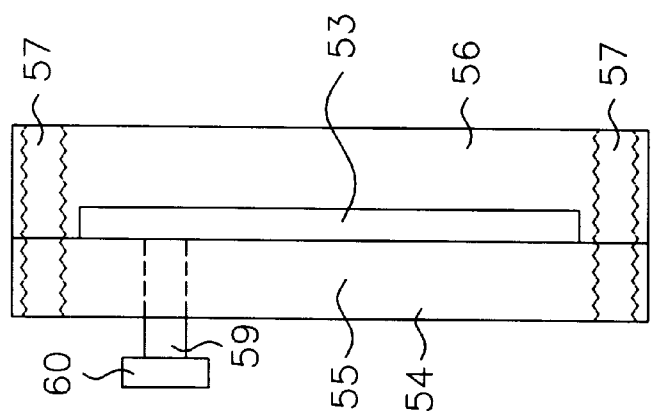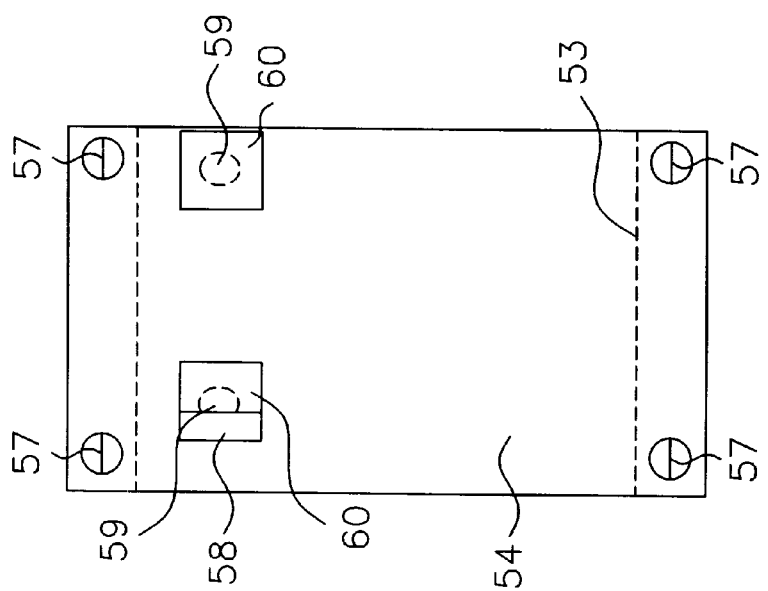

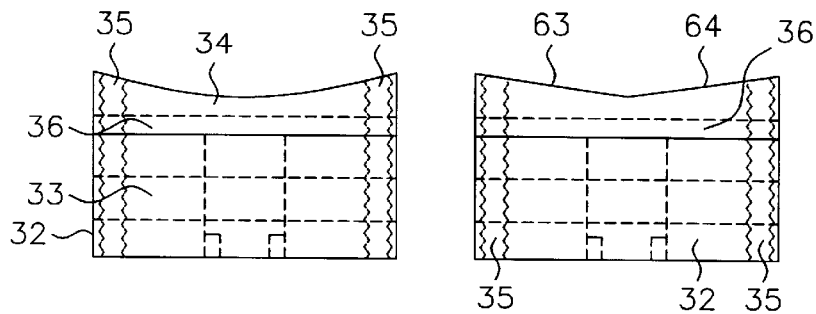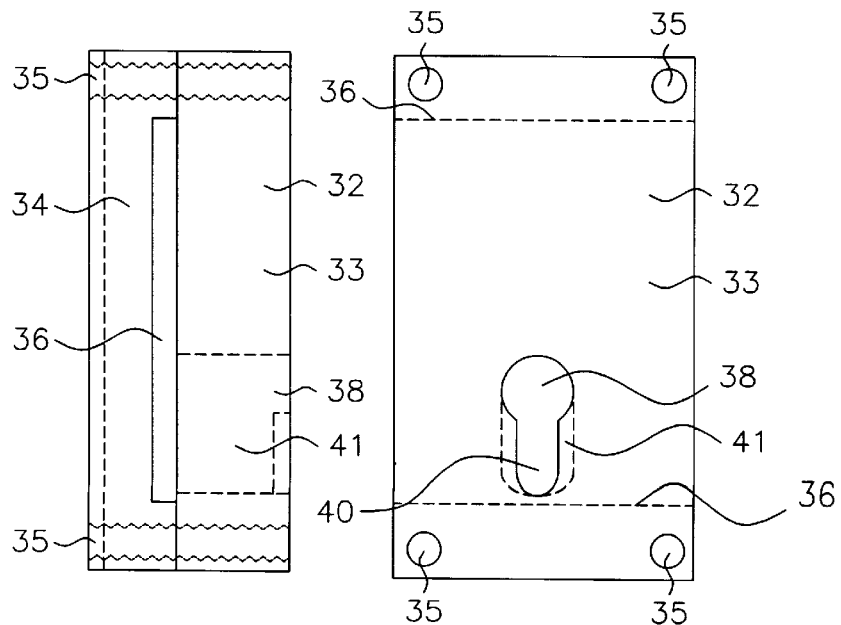

QUICK RELEASE LOCKING SYSTEM

This application claims the benefit of U.S. Provisional Patent Application Ser. No. 60/072,220 filed Jan. 22, 1998.

BACKGROUND OF THE INVENTION

This invention relates to a locking device, and more specifically to a device for releasably locking various structures together in a safe and secure manner.

SUMMARY OF THE INVENTION

The quick release locking system of the present invention is designed for use in releasably locking various structures together in a safe and secure manner. By the use of different configurations including different structure to attach the system to the structures to be attached, the removable configured backing plates, the locking brackets, and the holding brackets, the quick release locking system can be used in a wide variety of applications.

The locking brackets are the locking slotted bracket and the locking pin bracket portion of the locking system. The locking brackets can be secured by screws or bolts to a solid object such as a wall, the side of an emergency vehicle or the inside of a recreational vehicle to mount emergency tools, fire extinguishers, first aid response kits or any other item that is desired to be attached securely and removed quickly. By adding back plates or portions shaped to engage a substrate surface and a band extending around the object and through a slot in the backing plate to secure the locking system to the substrate forms, the locking system can be used on any structure that a band can be wrapped around. For example the backing plate may be curved to conform to the shape of a specific size pipe or tube or cylinder or it may be V-shaped to work on a range of sizes of round objects. Any other useful shape may be used on the back plate to conform to the surface on which it is to be supported. The locking system can be attached to a pipe or tube or a tank. This would allow the locking system to be affixed to a wide variety of applications such as wheel chairs or gurneys for mounting oxygen bottles. To scuba air cylinders to attach multiple cylinders together, or to mount a pony bottle on a full sized cylinder. For use on boat railings to secure throwable floatation devices or deck equipment; for use on cooking grills for easy removing and storage. For use on pick up trucks a person will be able to easily attach and detach ladders to ladder racks by the use of the quick release locking system.

For applications where the supported member is long, heavy or where the relative positions of the attached members are important, the holding bracket portion of the system, including the holding slotted bracket and the holding pin bracket portions of the quick release locking system can also be used.

In use the locking portions are attached to a first member and a second member in engaging relation to each other. When the members are to be locked together, the headed pins on the locking pin bracket slide into the T-shaped slot in the locking slotted bracket and are secured in relative position to each other by a locking lever acting against the pins. To release the two members from engagement with each other the locking lever is moved in the locking lever slot to a position outside of the T-shaped slot and the members are disengaged.

When a holding slotted bracket and a holding pin bracket are also used, the holding portion of the locking system is engaged first and released last. To engage the first member and the second member, the headed pin on the holding pin bracket is inserted into the keyhole-shaped slot and then is moved into the undercut at the narrow end of the slot. The locking bracket portion of the system is then engaged. To release the members the locking portion is disengaged and then the headed pin is moved out of the undercut and out of the keyhole-shaped slot. Anywhere a strong, quick detachable clamping system is needed, this locking system will be useful.

It is an object of the present invention to provide an improved locking device.

It is another object to provide a locking device that can be quickly and securely latched, and easily released.

Another object is to provide a locking device that is simple to make, easy to use and economical to manufacture.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 13 is a front view of the locking slotted bracket with a shaped engaging surface affixed to the back thereof according to the invention.

FIG. 14 is a side view of the locking slotted bracket shown in FIG. 13.

FIG. 15 is an end view of the locking slotted bracket shown in FIG. 13 having an arcuate engaging surface.

FIG. 16 is an end view of the locking slotted bracket shown in FIG. 15 having a V-shaped engaging surface.

FIG. 17 is a front view of the locking pin bracket with a shaped engaging surface affixed to the back thereof according to the invention.

FIG. 18 is a side view of the locking pin bracket shown in FIG. 17.

FIG. 19 is an end view of the locking pin bracket shown in FIG. 17 having an arcuate engaging surface.

FIG. 20 is an end view of the locking pin bracket shown in FIG. 17 having a V-shaped engaging surface.

FIG. 21 is a front view of the holding slotted bracket with a shaped engaging surface affixed to the back thereof according to the invention.

FIG. 22 is a side view of the holding slotted bracket and shape engaging surface as shown in FIG. 21.

FIG. 23 is an end view of the holding slotted bracket shown with an arcuate shaped engaging surface as shown in FIG. 21.

FIG. 24 is an end view of the holding slotted bracket shown with a V-shaped engaging surface as shown in FIG. 21.

DESCRIPTION OF THE PREFERRED EMBODIMENT(S)

Figure 29:
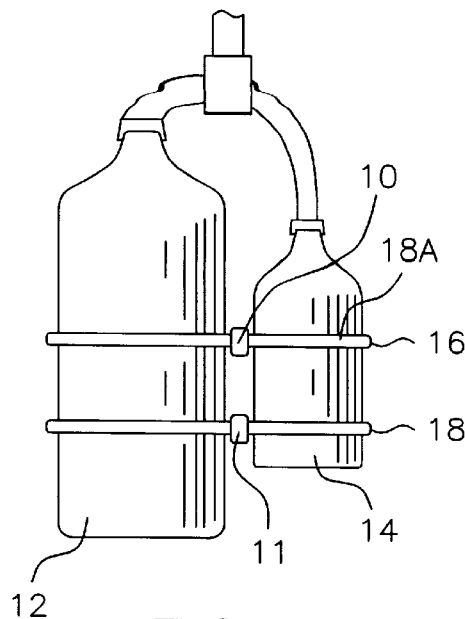
FIG. 29 is a side view of a scuba cylinder and a pony bottle secured to each other by means of clamp bands and the locking and holding devices according to the invention.

Now with more particular reference to the drawings, FIG. 29 shows locking device 10 for releasably securing a first member to a second member. For example as shown in FIG. 29, a first member 12, in the form of a scuba cylinder, is shown attached to a second member 14, shown for example in the form of a pony bottle.

Figure 3:
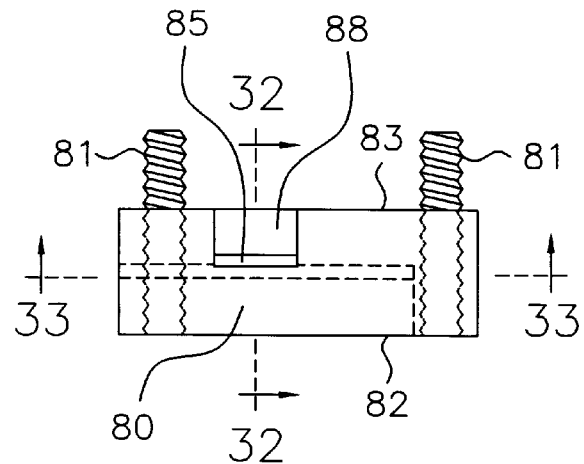
FIG. 3 is an end view of the locking slotted bracket shown in FIG. 1.
Figure 2:
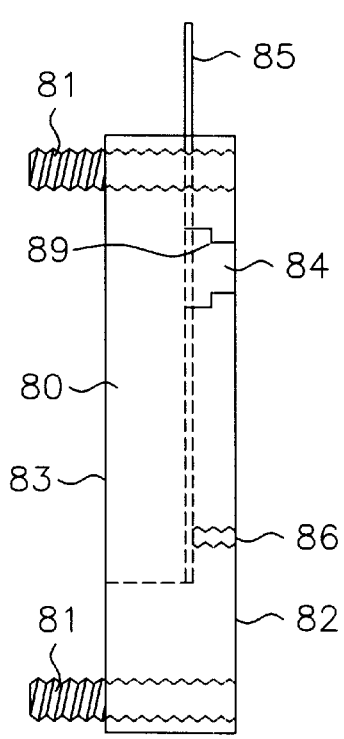
FIG. 2 is a side view of the locking slotted bracket shown in FIG. 1.
Figure 1:
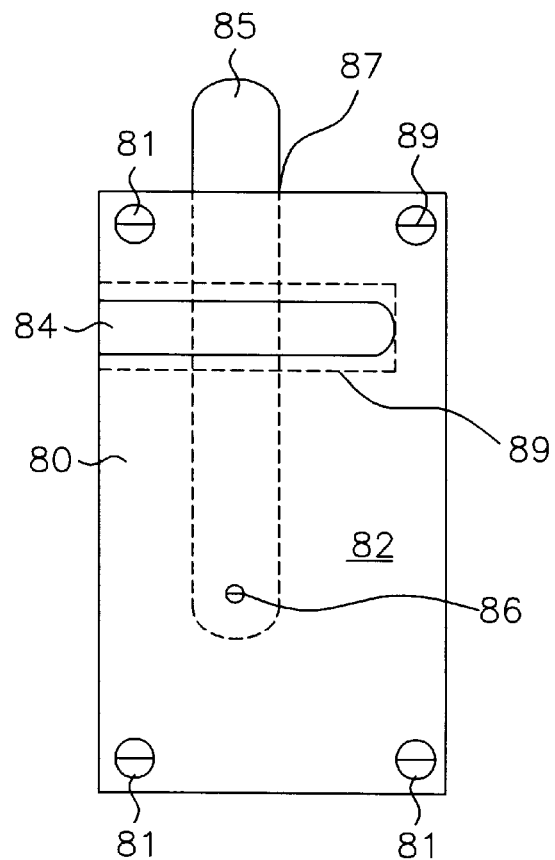
FIG. 1 is a front view of a locking slotted bracket having a receiving slot and locking lever forming a part of the locking device according to the invention.

As shown in FIGS. 1–3, locking slotted bracket 80 may be secured to a first member (shown in FIG. 30) with mounting bolts or screws 81 or by other suitable means. Locking slotted bracket 80 has front surface 82 and rear surface 83. T-shaped slot 84 extends across at least part of front surface 82. The T-shape of the slot provides undercut 89 for engaging pin heads 75 on locking pin bracket 70.

Locking lever 85, in the form of a spring loaded member, is attached in transverse slot 88, which crosses at least part of undercut 89 of T-shaped slot 84. Locking lever 85 is attached at first point 86 in transverse slot 88 and extends therethrough to second point 87 where locking lever 85 protrudes from locking slotted bracket 80. Locking lever 85 can be hand engaged to release locking pin bracket 70 from locking slotted bracket 80 by pushing locking lever 85 back into transverse slot 88 and out of T-shaped slot 84. With locking lever 85 out of T-shaped slot 84 pins 74 on locking pin bracket 70 can be slid along transverse slot 88 and thereby releasing locking slotted bracket 80 from locking pin bracket 70.

Figure 6:
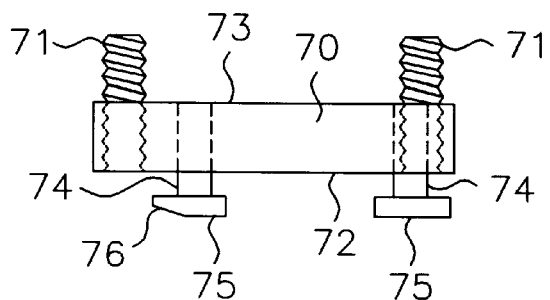
FIG. 6 is an end view of the locking pin bracket shown in FIG. 4.
Figure 4:
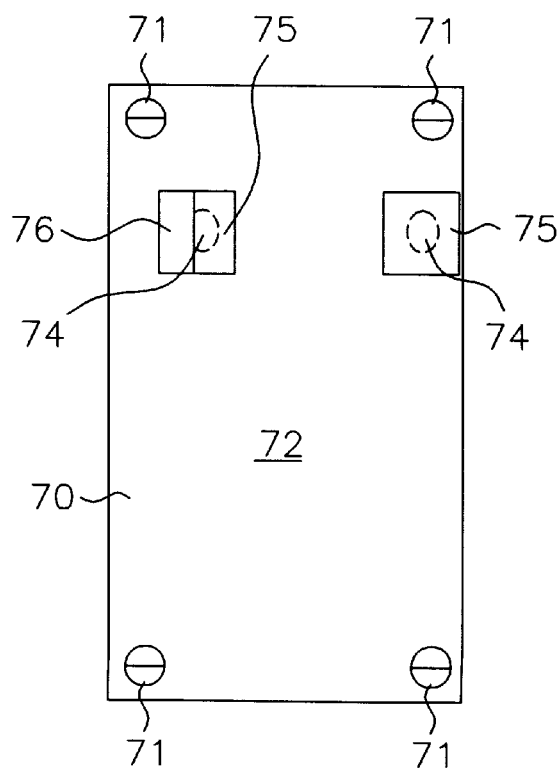
FIG. 4 is a front view of the locking pin bracket having holding pins which engage the slot in the slotted bracket according to the invention.
Figure 5:
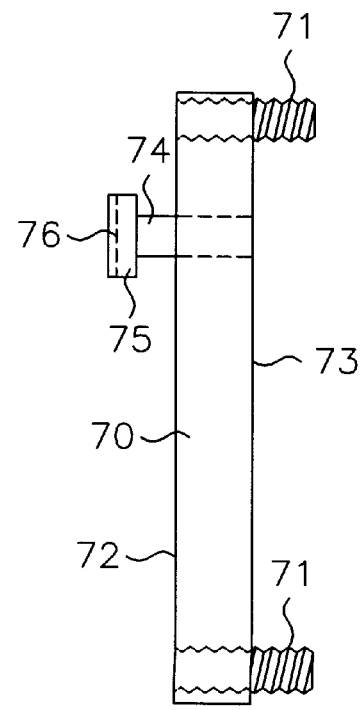
FIG. 5 is side view of the locking pin bracket shown in FIG. 4.

As shown in FIGS. 4–6, locking pin bracket 70 is secured to second member 14(shown in FIG. 31) with mounting bolts 71, or screws or by other suitable means. Locking pin bracket 70 has front surface 72 and rear surface 73. Rear surface 73 is held firmly to the second member 14 by mounting bolts 71. Front surface 72 has pins 74 extending outwardly therefrom. Pins 74 are alignable with T-shaped slot 84 of locking slotted bracket 80. Pins 74 have heads 75 which are alignable with undercut 89 of T-shaped slot 84. At least one of the heads 75 has a tapered surface 76 which will slide locking lever 85 back into transverse slot 88 as head 75 passes through T-shaped slot 84. When head 75 passes locking lever 85, locking lever 85 will move into a position between heads 75, securely holding locking pin bracket 70 to locking slotted bracket 80. To release the brackets, locking lever 85 is pushed by hand into transverse slot 88 and heads 75 can then slide out of T-shaped slot 84. Pin 74 snugly fits in T-shaped slot 84 where T-shaped slot 84 opens through front surface 72. The straight flat shape of the pin head 75 fits against the side of locking lever 85 securely positioning first member 12 relative to second member 14 when locking lever 85 is engaged.

Figure 9:
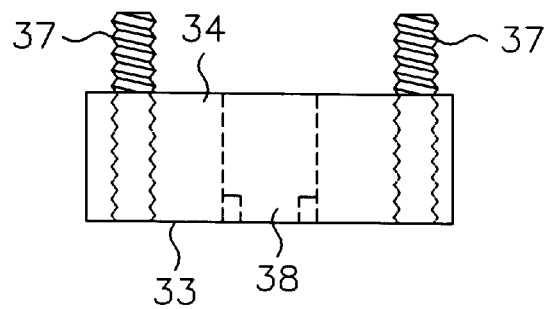
FIG. 9 is an end view of the holding slotted bracket shown in FIG. 7.
Figure 8:
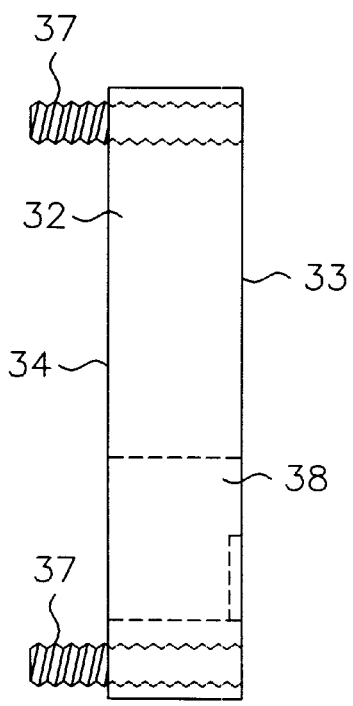
FIG. 8 is a side view of the holding slotted bracket shown in FIG. 7.
Figure 7:
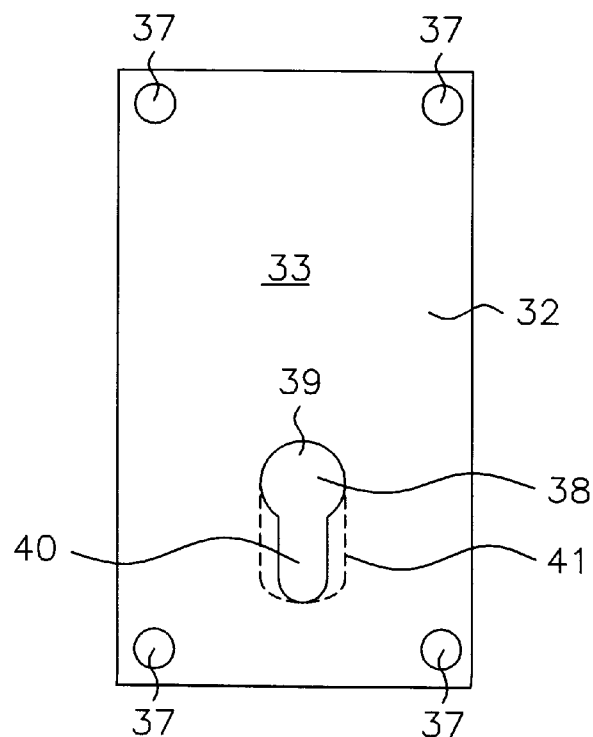
FIG. 7 is a front view of the holding slotted bracket having a recess to admit a holding pin and an undercut area to hold the holding pin in the holding slotted bracket forming a part of the locking device according to the invention.

As shown in FIGS. 7–9, holding slotted bracket 32 has keyhole shaped slot 38 having wide end 39 and narrow end 40 overlying undercut 41 under front surface 33. Holding slotted bracket 32 has holes through which mounting bolts 37 or screws may be inserted to attach holding slotted bracket 32 to any suitable surface.

Figure 12:
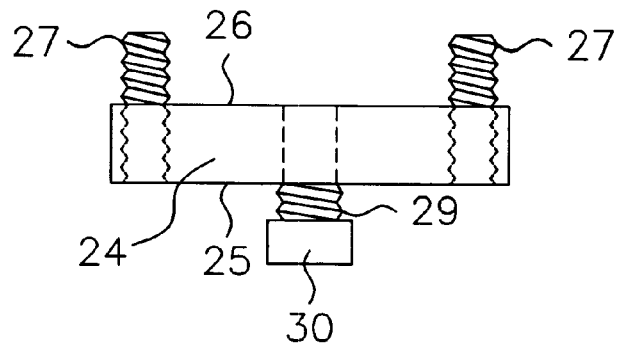
FIG. 12 is an end view of the holding slotted bracket shown in FIG. 10.
Figure 10:
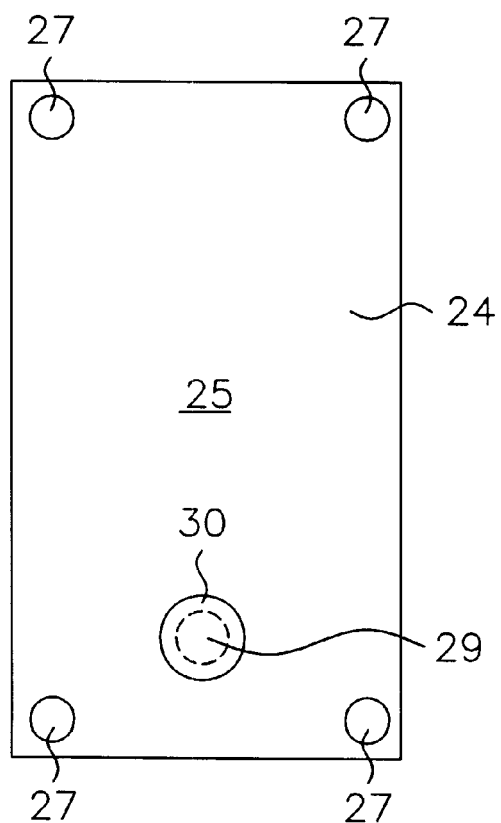
FIG. 10 is a front view of the holding pin bracket showing the holding pin which engages the slot in the holding slotted bracket according to the invention.
Figure 11:
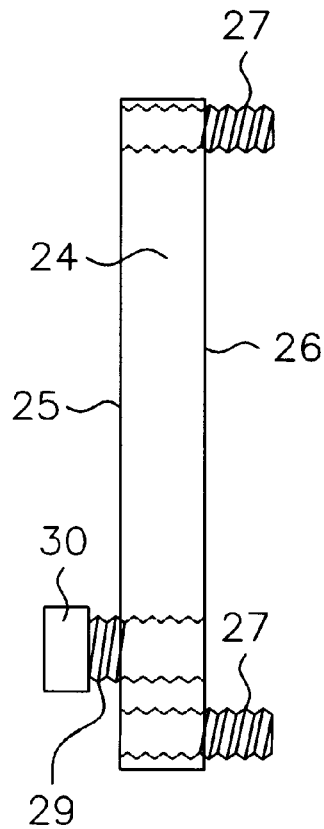
FIG. 11 is a side view of the holding slotted bracket shown in FIG. 10.
Figure 27:
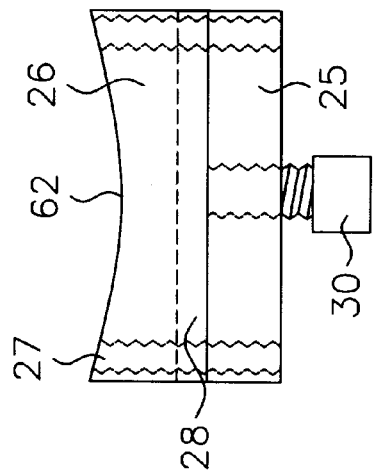
FIG. 27 is a end view of the holding pin bracket shown with an arcuate shaped engaging surface as shown in FIG. 25.
Figure 28:
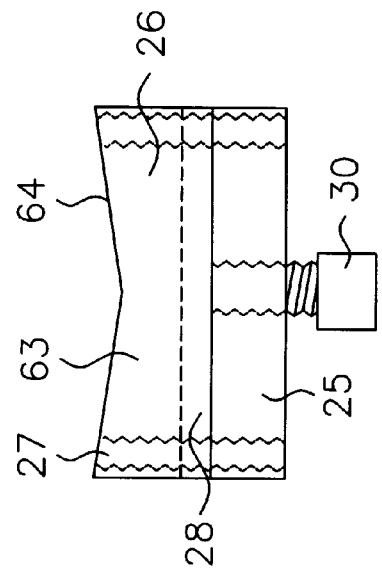
FIG. 28 is an end view of the holding pin bracket shown with a V-shaped engaging surface as shown in FIG. 25.
Figure 26:
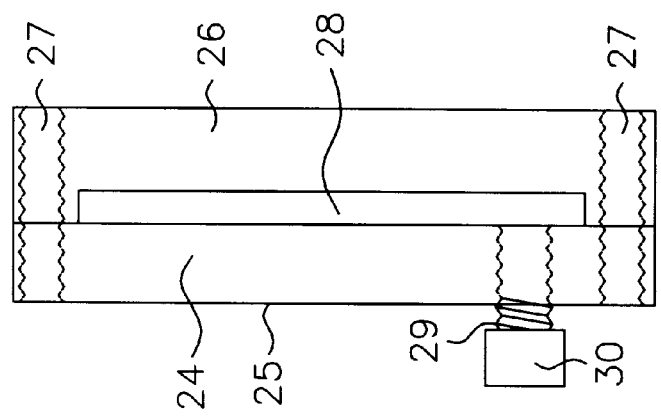
FIG. 26 is a side view of the holding pin bracket and a shaped engaging surface as shown in FIG. 25.
Figure 25:
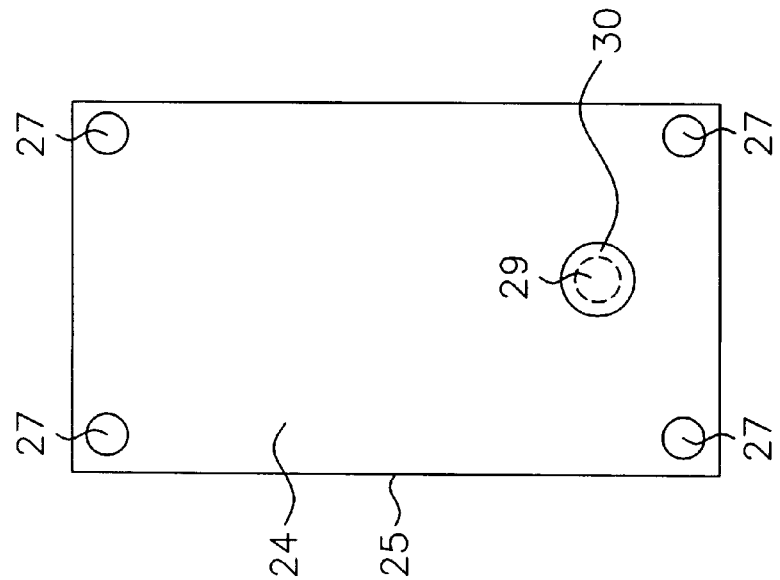
FIG. 25 is a front view of the holding pin bracket with a shaped engaging surface affixed to the back thereof according to the invention.

As shown in FIGS. 10–12, holding pin bracket 24 has front surface 25 and rear surface 26 and is secured to first member 12 by bolts 27, or screws or other suitable means. Holding pin bracket 24 has pin 29 extending outwardly therefrom. Head 30 is affixed to the outer end of pin 29.

Now with more particular reference to FIGS. 13–16, locking slotted bracket 42 has front portion 43 and rear portion 44 that are held together by screws 45 or other suitable means. Locking slotted bracket 42 is held to first member 12 by locking clamp bands 16A passing through elongated slot 46. Locking slotted bracket 42 has T-shaped slot 47 extending across front portion 43 thereof. Transverse slot 52 has locking lever 48 therein in the form of a spring loaded member, affixed thereto. Locking lever 48 extends from first point 49 to second point 50 and protrudes out of locking slotted bracket 42. T-shaped slot 47 has first surface cut portion 90 adapted to receive pins 59 and has undercut portion 51 which is adapted to receive heads 60.

As shown in FIGS. 17–20, locking pin bracket 54 has front portion 55 and rear portion 56 that are held together by screws 57 or other suitable means. Locking pin bracket 54 is held to second member 14 by third clamp band 18A passing through elongated slot 53. Locking pin bracket 54 has two pins 59 extending outwardly therefrom. Heads 60 are affixed to the outer end of pins 59. At least one of the pin heads 60 may be provided with tapered surface 58. Tapered surface 58 guides locking lever 48 rearwardly allowing pin 59 to move past locking lever 48. Rear portion 56 of locking bracket 54 may be provided with arcuate surface 62, as shown in FIG. 19, or a first flat surface 63 and a second flat surface 64 joined at an angle, as shown in FIG. 20, to engage second member 14.

As shown in FIGS. 21–24, holding slotted bracket 32 has front portion 33 and rear portion 34 that are held together by screws 35 or other suitable means. Holding slotted bracket 32 is held to scuba cylinder 12 by holding clamp band 16B passing through elongated slot 36.

As shown in FIGS. 25–28, holding pin bracket 24 has front portion 25 and rear portion 26 that are held together by screws 27, or other suitable means. Holding pin bracket 24 is held to first member 14, shown as a pony bottle, by fourth clamp band 18B passing through elongated slot 28 in rear portion 26.

Figure 30:
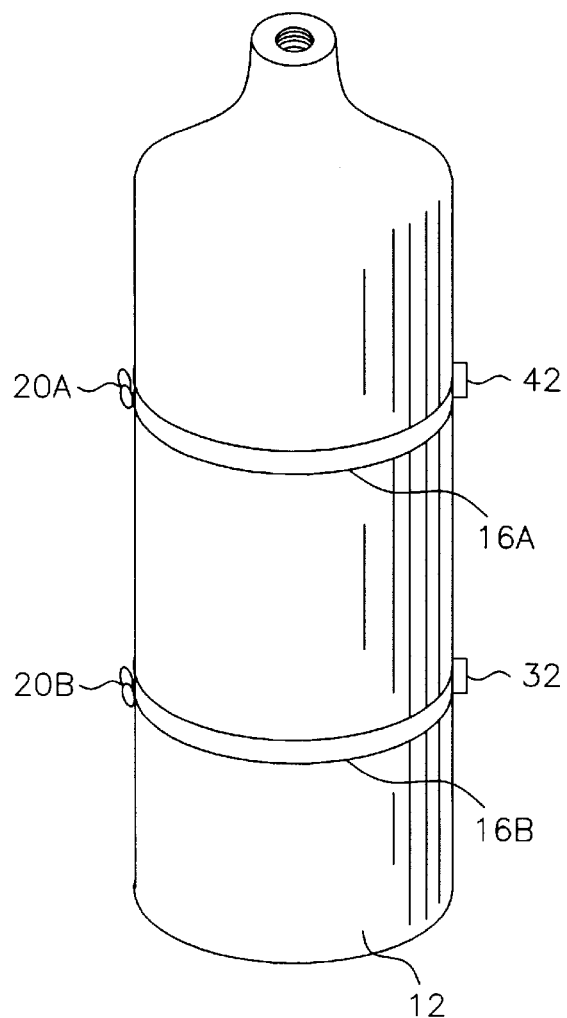
FIG. 30 is a side perspective view of a scuba cylinder with a locking slotted bracket and a holding slotted bracket secured thereon with clamp bands as shown in FIG. 29.
Figure 31:
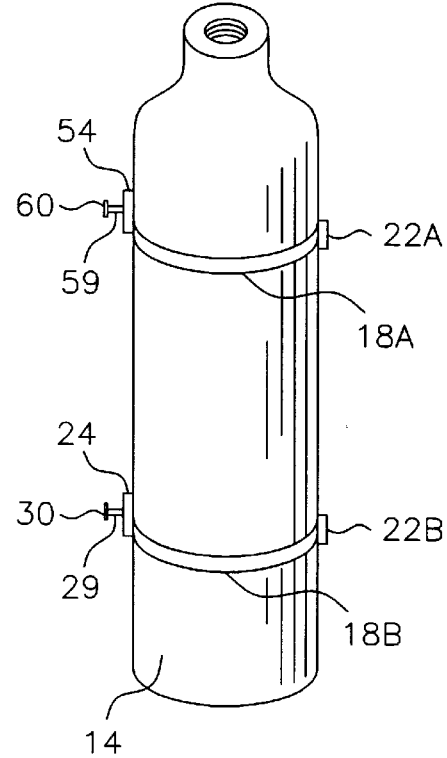
FIG. 31 is a side perspective view of a pony bottle with a locking pin bracket and a holding pin bracket secured thereon with clamp bands as shown in FIG. 29.

As shown in FIGS. 29–31, locking device 10 and holding device 11 may be supported by first clamp band 16A, and second clamp band 16B extending around first member 12 and clamp band 18A,B extending around second member 14. First clamp band 16A and second clamp band 16B are positioned adjacent each other in a predetermined position on first member 12 and are fixed securely in place by hose clamps 20A,B. First clamp band 18A, and second clamp band 18B are positioned adjacent each other in a predetermined position on second member 14 and are fixed securely in place by hose clamps 22A,B. Clamp bands 16A,B;18A,B are preferably made of stainless steel and may be coated with rubber or other suitable cladding material to prevent damage to the surface of first member 12 and second member 14.

To lock second member 14, shown as a pony bottle, to a first member 12, shown as a scuba cylinder in FIGS. 21–28, head 30 of pin 29, on holding pin bracket 24, is inserted into hole 39 of keyhole-shaped slot 38 in holding slotted bracket 32. Head 30 moves through keyhole-shaped slot 38 to narrow end 40, thereby locking holding pin bracket 24 to holding slotted bracket 32. First member 14 is then rotated to bring locking pin bracket 54 into engagement with holding slotted bracket 42. Locking lever 48, on locking slotted bracket 42, is depressed to permit heads 60, on locking pin bracket 54, to slide into T-shaped slot 47, thereby securing locking pin bracket 54 to locking slotted bracket 42.

To remove first member 14 from second member 12, locking lever 48 is depressed to allow heads 60 to move out of T-shaped slot 47. Once heads 60 are clear of locking slotted bracket 42, first member 14 is lifted aligning head 30 with hole 39 of keyhole shaped slot 38. First member 14 is then moved outwardly until head 30 clears holding slotted bracket 32 and unlocking is complete.

As shown in FIGS. 15, 16, 19 and 20, the shaped surfaces on rear portion 44,56 may be provided with two flat planar surfaces 63,64 disposed at an acute angle to each other to receive a post, a pipe or a tube, or rear portion 44 may be provided with an arcuate shaped surface 62 to receive a particular size post, pipe or tune. Rear portion 44 may be provided with particular shapes to receive particular first members and second members.

Figure 32:
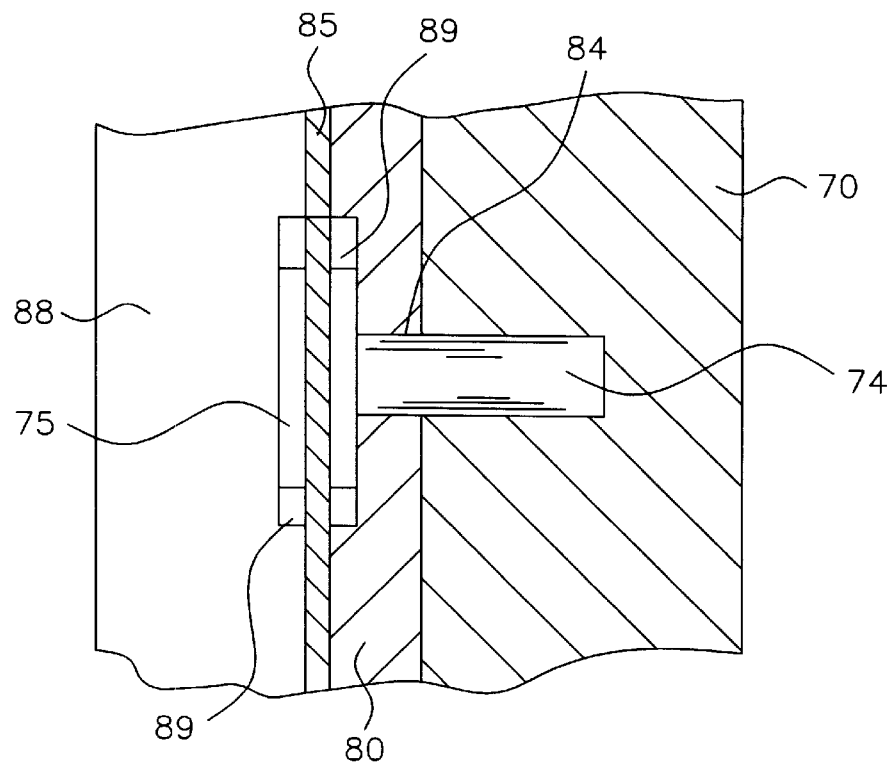
FIG. 32 is an enlarged partial cross-sectional view taken on line 32—32 of FIG. 3 showing a locking slotted bracket and a locking pin bracket in the locked position.
Figure 33:
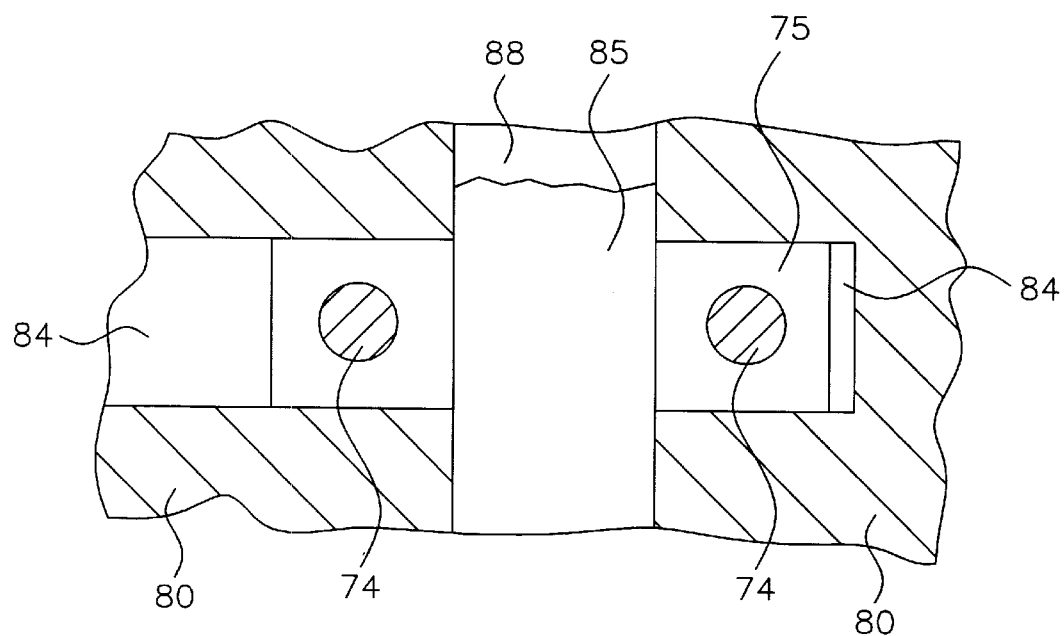
FIG. 33 is an enlarged partial cross-sectional view taken on line 33—33 of FIG. 3 showing a locking slotted bracket and a locking pin bracket in the locked position.

As shown in FIGS. 32 and 33, locking slotted bracket 80 and locking pin brackets 70 fit together in a locked position with locking lever 85 extending through undercut 89 between heads 75 of pins 74. A flat side of each pin head 75 resting against the flat sides of locking lever 85 providing a rigid connection.

The foregoing specification sets forth the invention in its preferred, practical forms but the structure shown capable of modification within a range of equivalents without departing from the invention which is to be understood is broadly novel as is commensurate with the appended claims.

The embodiments of the invention in which an exclusive property or privilege is claimed are defined as follows:

1. A locking device for locking a first member to a second member comprising:

a locking slotted bracket and a locking pin bracket;

a slot in said locking slotted bracket;

said slot having an undercut;

a pin affixed to said locking pin bracket;

said pin adapted to be received in said slot;

said pin having a head adapted to be received in said undercut;

means for locking said pin in said slot whereby said locking pin bracket and said locking slotted bracket are adapted to attach said first member to said second member;

said means for locking further comprises:

a lever space and a lever extending from a first end of said lever space and extending to an end of said locking slotted bracket and protruding from the end of said locking slotted bracket;

said lever being resilient and biased to rest adjacent the front of said lever space; and, said lever at rest extends through said undercut where said lever space crosses said slot.

2. The locking device recited in claim 1 wherein said locking pin bracket is adapted to attach to said first member and said locking slotted bracket is adapted to attach to said second member.

3. The locking device recited in claim 1 wherein said head of said pin has flat sides that fit snugly in said undercut to provide a stable fixed relative position between said first member and said second member.

4. The locking device recited in claim 1 further comprising a holding slotted bracket and a holding pin bracket to be attached to said first member and to said second member at a point remote from said locking slotted bracket and from said locking pin bracket.

5. The locking device recited in claim 1 further comprising:

a first spaced pin and a second spaced pin in said locking pin bracket;

said first spaced pin having a tapered head;

said lever will be pushed rearwardly to allow said first spaced pin to pass and then said lever will snap forward between said first spaced pin and said second spaced pin to secure said locking device.

6. The locking device recited in claim 5 wherein said locking device is released by pushing said lever rearwardly and sliding said pins along said slot until said pin bracket and said slotted bracket are disengaged.

7. A locking device for locking a first member to a second member comprising:

a locking slotted bracket and a locking pin bracket;

a slot in said locking slotted bracket;

said slot having an undercut;

a pin affixed to said locking pin bracket;

said pin adapted to be received in said slot;

said pin having a head adapted to be received in said undercut;

means for locking said pin in said slot;

a first elongated slot extending through said locking pin bracket;

a second elongated slot extending through said locking slotted bracket;

a shaped engaging surface on said locking slotted bracket and on said locking pin bracket on a surface opposite said pin and said slot;

a locking lever is adapted to be depressed to allow said head on said locking pin bracket to move through said slot and undercut in said locking slotted bracket;

said second member is adapted to be lifted thereby aligning said head of said pin of said locking pin bracket with said slot and undercut in said locking slotted bracket;

said second member being adapted to be moved outwardly until said head is clear of said locking slotted bracket whereby unlocking is complete and said second member is unlocked from said first member.

8. The locking device recited in claim 7 further comprising said locking slotted bracket having a front portion having said slot and a rear portion adapted to engage said first member;

said locking pin bracket having a front portion supporting said pin and a rear portion adapted to engage said second member attached to said front portion.

9. The locking device recited in claim 8 wherein at least one of said rear portions has two flat planar surfaces disposed at an acute angle to each other to receive a cylindrical member.

10. The locking device recited in claim 8 wherein said rear portion has an arcuate surface to receive a cylindrical member.

11. The locking device recited in claim 7 further comprising a holding slotted bracket having a front portion and a rear portion;

a holding pin bracket having a front portion and a rear portion;

said rear portions being shaped to engage a first member or a second member.

12. The locking device recited in claim 11 wherein said holding slotted bracket has an elongated slot;

said holding pin bracket has an elongated slot;

holding clamp bands extend through said elongated slots whereby said holding slotted bracket and said holding pin bracket are adapted to be held to said first member.

13. The locking device recited in claim 11 wherein said holding slotted bracket has a keyhole shaped slot;

said keyhole shaped slot having a wide end and a narrow end overlying an undercut of said front portion.

14. The locking device recited in claim 7 further comprising a holding pin bracket having an elongated slot;

a holding clamp band adapted to extend through said elongated slot whereby said holding pin bracket is adapted to be held to said second member.

15. The locking device recited in claim 14 wherein said holding pin bracket has a pin extending outwardly therefrom; and, said pin having a head affixed to the outer end thereof.

16. The locking device recited in claim 7 wherein said locking slotted bracket has locking clamp bands passing through said elongated slot whereby said locking slotted bracket is held to said first member.

17. The locking device recited in claim 7 wherein said locking slotted bracket has a locking lever affixed thereto;

said locking lever extends from a first point in said locking slotted bracket to a second point at an end of said locking slotted bracket and protrudes out of said locking slotted bracket.

18. The locking device recited in claim 7 wherein said locking pin bracket has a front portion and a rear portion.

19. The locking device recited in claim 18 wherein said locking pin bracket has an elongated slot;

locking clamp bands passing through said elongated slot whereby said locking pin bracket is adapted to be held to said second member.

20. The locking device recited in claim 19 wherein said locking pin bracket has two spaced pins extending outwardly therefrom;

said pins each having a head affixed to the outer end thereof.

21. The locking device recited in claim 20 wherein aid hole of said keyhole slot in said lower slotted bracket being adapted to receive said head of said pin;

said head being adapted to move downwardly into said narrow end thereby locking said holding pin bracket to said holding slotted bracket;

said second member is adapted to be rotated to bring said locking pin bracket into engagement with said locking slotted bracket;

said locking lever on said locking slotted bracket being depressed by said first spaced pin as it slides into said T-shaped slot;

said locking lever snaps into a space between said pins thereby locking said locking pin bracket to said locking slotted bracket.

22. A locking device for locking a first member to a second member comprising:

a slotted member and a pin member;

said slotted member having a slot having an end surface and two edge surfaces;

said edge surfaces of said slot being undercut providing a recessed slot at each side of said slot;

a headed pin;

said headed pin [member] adapted to be supported on a surface of a pin member;

said headed pin adapted to be received in said slot and said undercut whereby a pin member is held to said slotted member;

a transverse slot intersecting said slot and said undercut;

a lever received in said transverse slot;

said lever being attached to said slotted member at one end and extending therefrom across said slot and said undercut;

said lever being resilient and being urged to a position intersecting said slot and said undercut and being adapted to be received in between said heads whereby said headed member is held to said slotted member.

23. The locking device recited in claim 22 wherein said lever can be deflected from said slot and said undercut whereby said head can slide out of said slot and said undercut past said lever.

24. The locking device recited in claim 23 wherein a support means is connected to said locking device to attach said locking device to two members to be held together.

25. The locking device recited in claim 22 further comprising a second headed pin spaced for and aligned with said headed pin;

said second headed pin is adapted to be received in said slot and said undercut whereby a pin member is held in alignment with said slotted member.

26. The locking device recited in claim 25 wherein said headed pin and said spaced second headed pin receive said lever therebetween whereby said slotted member is held to said pin member.

27. The locking device recited in claim 25 wherein said lever can be deflected from between said headed pins whereby said headed pins can slide out of said slot and said undercut past said lever.

28. A locking device for releasably securing a first member to a second member comprising:

- a locking slotted bracket and means for attaching said locking slotted bracket to said first member;
- a locking pin bracket and means for attaching said locking pin bracket to said second member;
- a holding slotted bracket and means for attaching said holding slotted bracket to said first member;
- a holding pin bracket and a pin with a head extending outwardly from said holding pin bracket;
- a slot with an undercut extending into said holding slotted bracket;
- said slot and said undercut adapted to receive said pin and said head thereby holding said first member to said second member;
- a pin with a head extending outwardly from said locking pin bracket;
- a slot with an undercut extending into said locking slotted bracket;
- said slot and said undercut adapted to receive said pin and said head;
- resilient means extending through said undercut for releasably securing said pin and said head in said locking pin bracket in said slot and said undercut in said locking slotted bracket whereby said first member is releasably secured to said second member.

29. The locking device recited in claim 28 wherein said means for attaching said locking slotted bracket to said first member comprises an elongated slot and a first clamp band;

said elongated slot extending through said locking slotted bracket, said first clamp band extending through said elongated slot and extending around said first member securing said locking slotted bracket to said first member;

said means for attaching said holding slotted member to said first member comprises an elongated slot and a second clamp band;

said elongated slot extending through said holding slotted bracket, said second clamp band extending through said elongated slot and extending around said first member securing said holding slotted bracket to said first member;

said means for attaching said locking pin bracket to said second member comprises an elongated slot and a third clamp band;

said elongated slot extending through said locking pin bracket, said third clamp band extending through said elongated slot and extending around said second member securing said locking pin bracket to said second member;

said means for attaching said holding pin bracket to said second member comprises an elongated slot and a fourth clamp band;

said elongated slot extending through said holding pin bracket, said fourth clamp band extending through said elongated slot and extending around said second member securing said holding pin bracket to said second member.

30. The locking device recited in claim 28 wherein said means for releasably securing said pin and said head in said slot and said undercut comprises:

- a lever space which extends across said undercut;
- a resilient lever supported in said lever space and extending generally across said undercut; and,
- said resilient lever is adapted to engage said head in said undercut.

* * * * *